Figure 7:
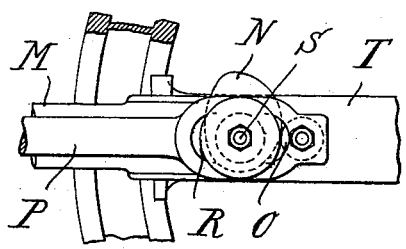

No. 618,540. Patented Jan. 31, 1899.
J. HALL.
MACHINE FOR SOFTENING LEATHER.
(Application filed Sept. 9, 1898.)
(No Model.) 5 Sheets—Sheet 1.
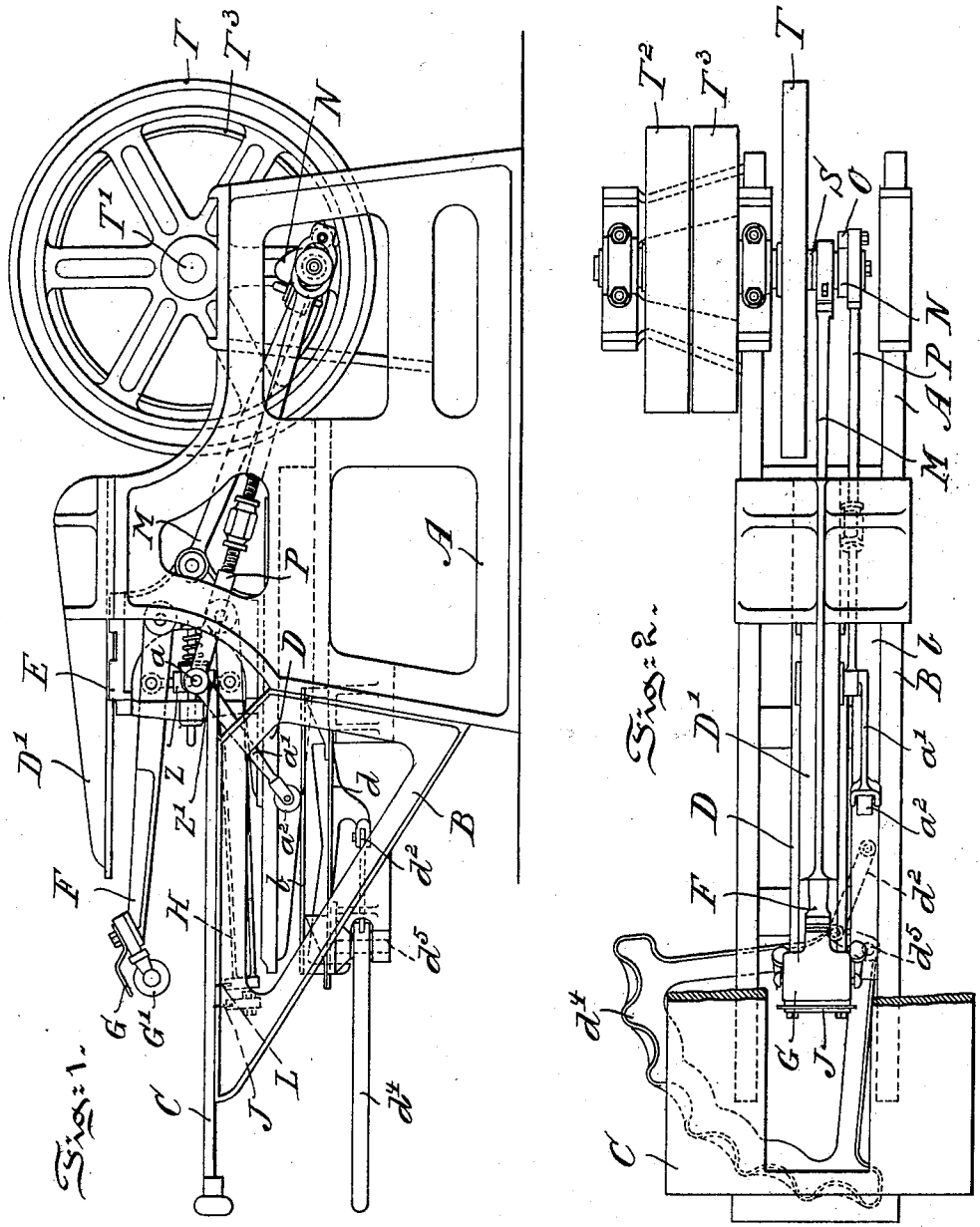
Witnesses:
Thomas M. Smith.
Richard C. Maxwell.
Inventor:
Joseph Hall,
By J. Walter Douglass
Attorney.

No. 618,540. Patented Jan. 31, 1899.
J. HALL.
MACHINE FOR SOFTENING LEATHER.
(Application filed Sept. 9, 1898.)
(No Model.) 5 Sheets—Sheet 2.
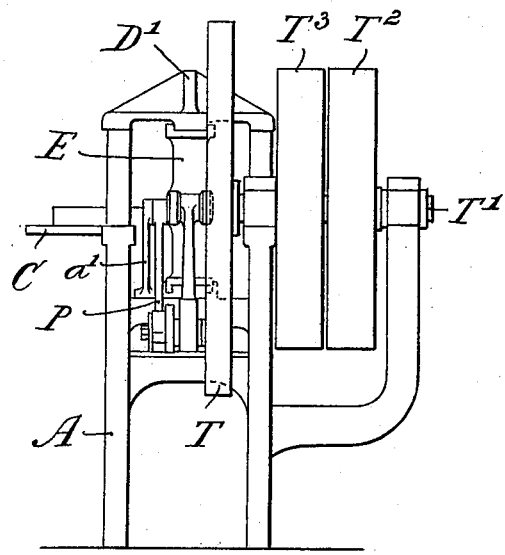
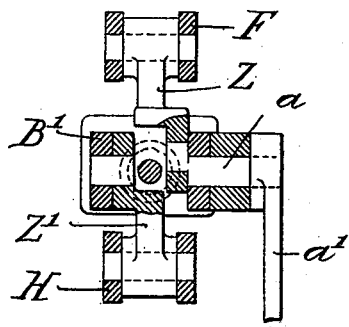
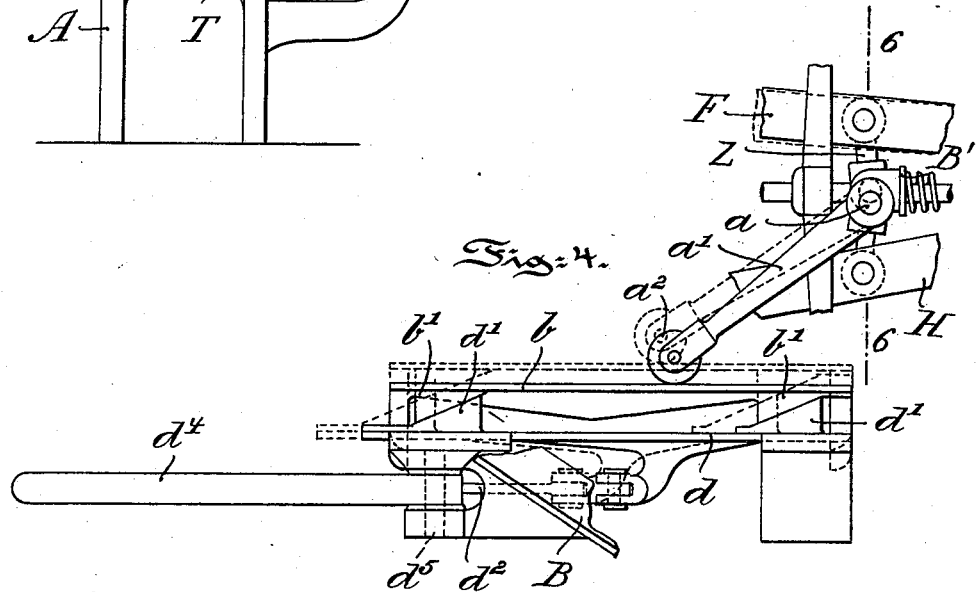
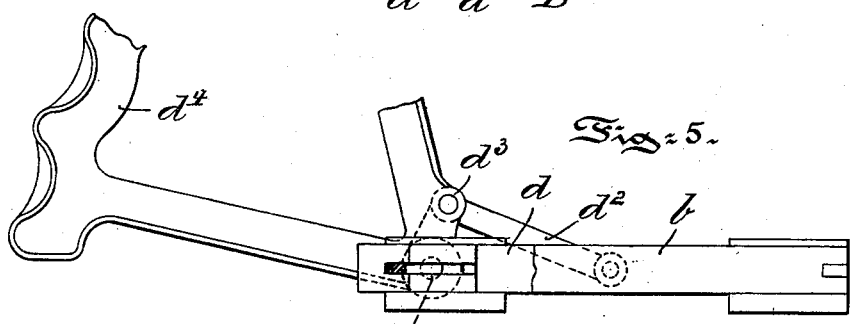
Witnesses:
Thomas M. Smith
Richard E. Maxwell
Inventor:
Joseph Hall,
By J. Walter Douglas
Attorney No. 618,540. Patented Jan. 31, 1899.
J. HALL.
MACHINE FOR SOFTENING LEATHER.
(Application filed Sept. 9, 1898.)

(No Model.) 5 Sheets—Sheet 3.

Witnesses:
Thomas M. Smith.
Richard C. Maxwell

Inventor:
Joseph Hall,
By J. Walter Douglas
Attorney.

THE NORRIS PETERS CO., PHOTO-LITHO., WASHINGTON, D. C.

No. 618,540. Patented Jan. 31, 1899.
J. HALL.
MACHINE FOR SOFTENING LEATHER.
(Application filed Sept. 9, 1898.)
(No Model.) 5 Sheets—Sheet 4.
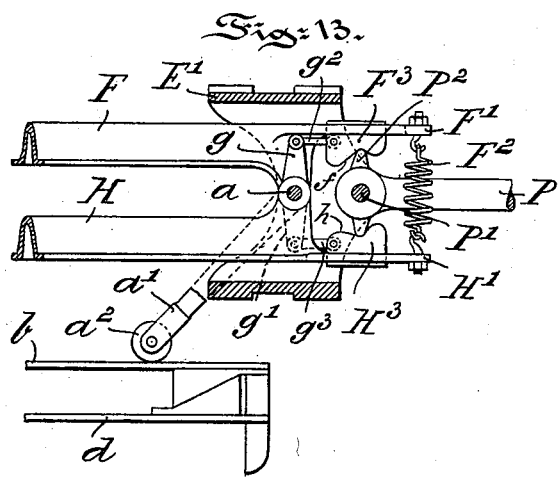
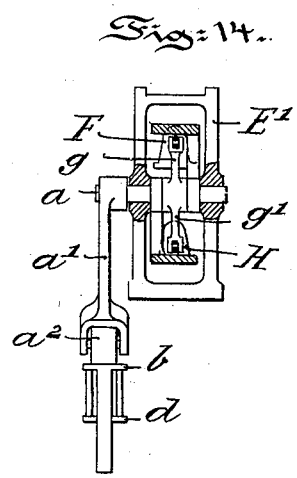
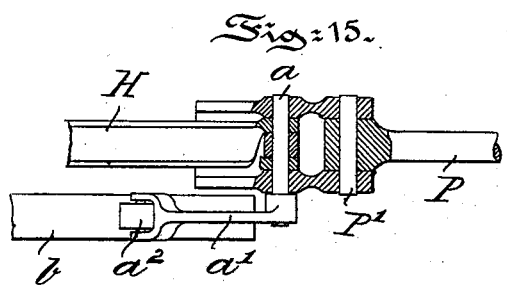
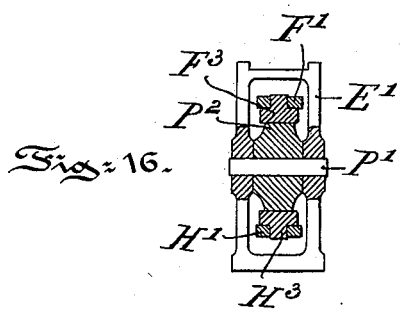
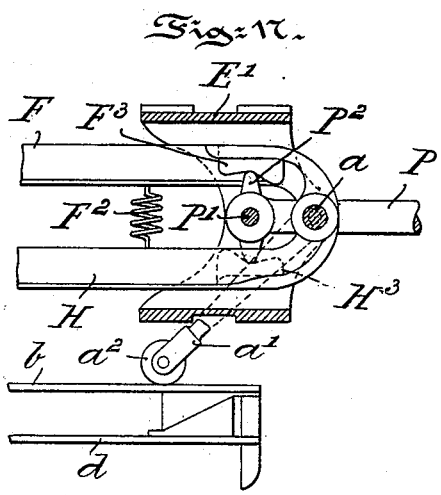
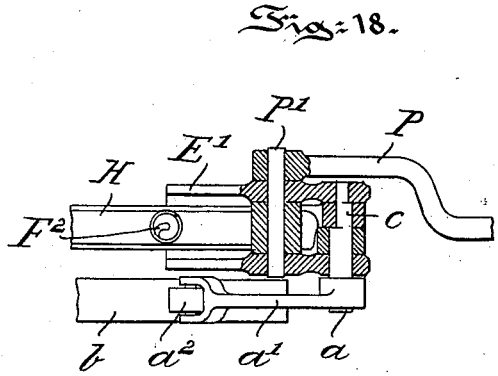
Witnesses:
Thomas M. Smith.
Richard C. Maxwell.
Inventor:
Joseph Hall,
By J. Walter Douglass
Attorney.
THE NORRIS PETERS CO., PHOTO-LITHO., WASHINGTON, D. C.

No. 618,540. Patented Jan. 31, 1899.
J. HALL.
MACHINE FOR SOFTENING LEATHER.
(Application filed Sept. 9, 1898.)
(No Model.) 5 Sheets—Sheet 5.
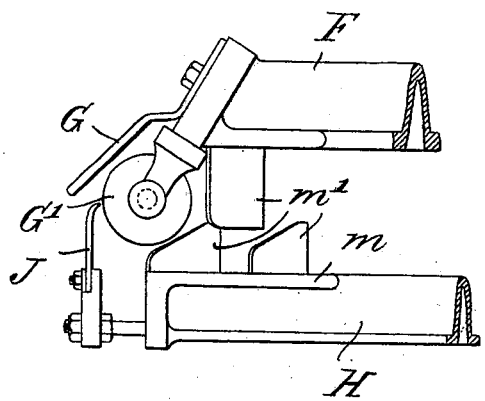
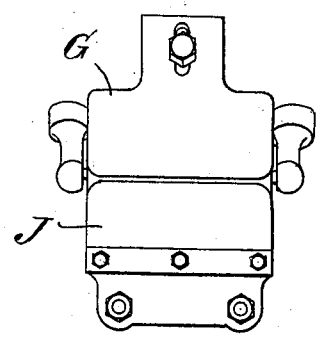
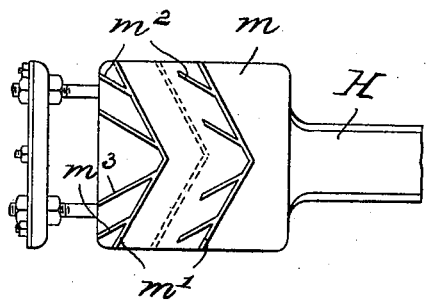
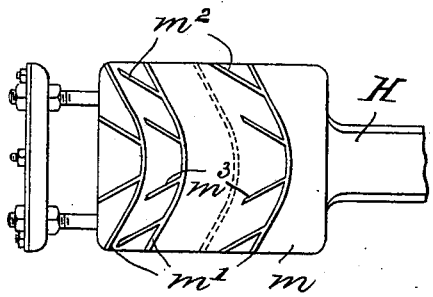
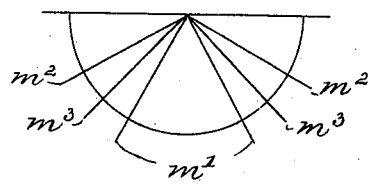

UNITED STATES PATENT OFFICE.

JOSEPH HALL, OF LEEDS, ENGLAND.

MACHINE FOR SOFTENING LEATHER.

SPECIFICATION forming part of Letters Patent No. 618,540, dated January 31, 1899.

Application filed September 9, 1898. Serial No. 690,557. (No model.)

*To all whom it may concern:*

Be it known that I, JOSEPH HALL, a subject of the Queen of Great Britain, residing at Leeds, in the county of York, England, have invented certain new and useful Improvements in Machines for Softening Leather, of which the following is a specification.

My invention has relation to a machine for setting out, slicking, or softening hides, skins, or leather, and in such connection it relates to the construction and arrangement of such a machine.

In machines of the character to which this invention relates there are employed two arms pivoted at one end and carrying at the free ends the tools to be employed and the plates or supports, and these arms are provided with mechanism to reciprocate the arms and mechanism to close and open the free ends of the arms.

The present improvement consists, primarily, of mechanism, in addition to the reciprocating and opening and closing mechanisms, whereby during the reciprocation of the arms the free ends may be brought more or less closely together; and it consists, further, in connection with these mechanisms, of an improved mechanism for opening and closing the arms.

My invention, stated in general terms, consists of a machine for slicking or softening hides, skins, or leather constructed and arranged in substantially the manner hereinafter described and claimed.

The nature and scope of my invention will be more fully understood from the following description, taken in connection with the accompanying drawings, forming part hereof, in which—

Figure 8:
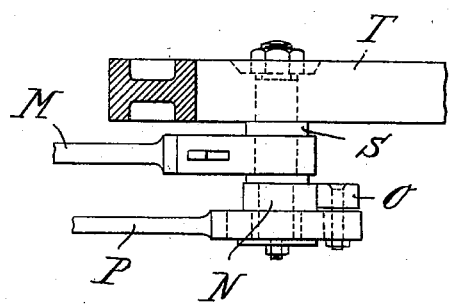
Figure 9:
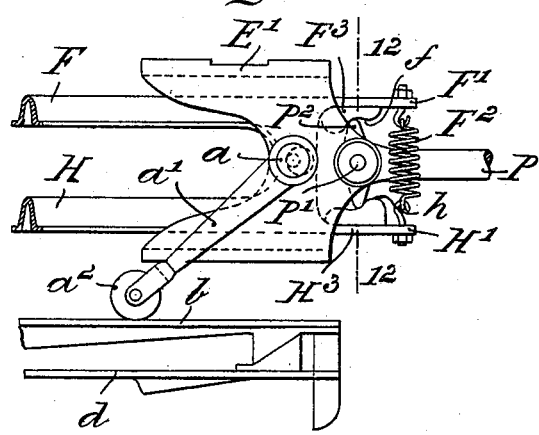
Figure 10:
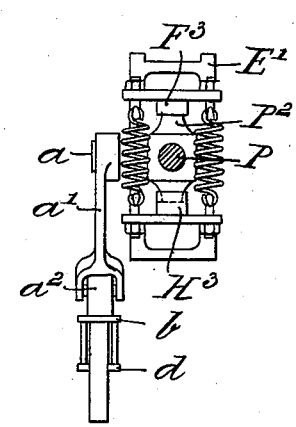
Figure 11:
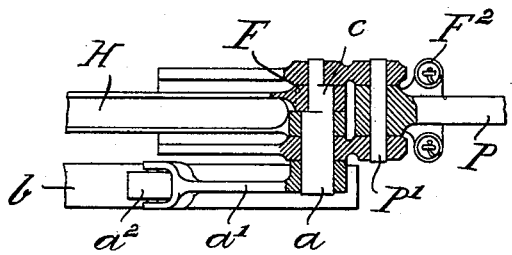
Figure 12:
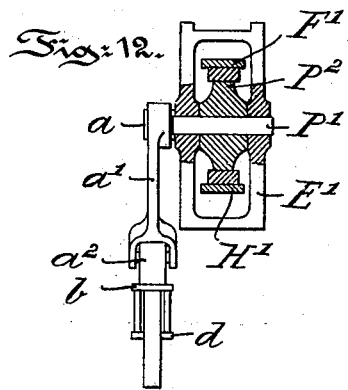

Figure 1 is a side elevational view of a machine embodying the main features of my invention. Fig. 2 is a top or plan view thereof, partly broken away. Fig. 3 is an elevational view of the power end of the machine. Fig. 4 is an enlarged detail view illustrating in side elevation the mechanism for altering the movement of the arms toward or from each other. Fig. 5 is an enlarged detail view of the sector and connections for operating the mechanism of Fig. 4. Fig. 6 is an enlarged cross-section on the line 6 6 of Fig. 4. Figs. 7 and 8 are enlarged details of the cam controlling the reciprocating and opening and closing mechanisms for the arms of the machine. Fig. 9 is an enlarged side elevational view showing an improved mechanism for opening and closing the arms in conjunction with the mechanism for altering the movement of said arms toward or from each other. Fig. 10 is an end elevation of Fig. 9. Fig. 11 is a horizontal section of Fig. 9. Fig. 12 is a vertical sectional view on the line 12 12 of Fig. 9. Figs. 13 to 16, inclusive, are detail views of a modified form of the mechanism illustrated in Fig. 9. Figs. 17 and 18 are detail views of another modification of the mechanism illustrated in Fig. 9. Figs. 19 to 22 are detail views of a preferred form of tool for use in the machine, and Fig. 23 is a diagram of the angular arrangement of the blades on the tools illustrated in Figs. 19 to 22.

Referring to the drawings, Figs. 1 to 8, inclusive, A represents the frame of the machine, to which the brackets B are secured to form a support for the table C, upon which the hide, skin, or leather is laid preparatory to the slicking or softening operation. Between the brackets B and projecting from the frame A is a platform D, grooved or channeled to receive and guide the block or head E, which is adapted to be reciprocated between the platform D and an upper guide D', carried by the frame A. To the block or head E is pivoted one end of an arm or beam F, the free end of which carries the operating-tools G and G', which, as illustrated in Fig. 1, are a slicker and a roller. To the head or block E is likewise pivoted one end of another arm or beam H, carrying at its free end, as illustrated in Fig. 1, two vertical plates J and L of varying elevations, upon which the work is supported or rests when the roller G' and slicker G act thereon to soften the same. The plates J and L and the roller G' and slicker G coact in the usual well-known manner. To the head or block E is also pivoted one end of a connecting-rod M, the other end of which is pivotally connected to a stud S, carried by the wheel T. On the shaft T' of the wheel T are located the fast and loose pulleys $T^2$ and $T^3$, by means of which the machine may be brought into and out of operation. Referring now to Figs. 1, 7, and 8, the stud S travels with the wheel and the rod M turns on said stud. To the stud S is secured a cam N, against the periphery of which rests a roll O, carried at one end of a rod P, which rod is slotted, as at R, to the stud S. During the turning or rotation of the wheel T and its stud S the cam N rotates and the roll O rides over the periphery of said cam, and thereby shifts the rod P back and forth. The free end of the rod P is connected by toggle levers or arms Z and Z' with each of the arms or beams F and H, and through these toggle-levers Z and Z' the rod P in reciprocating serves to bring the arms F and H together or to separate them during the operation of the machine. A spring-stud B' or its equivalent serves to keep the roll O normally pressed against the cam-surface N.

So far as described the arrangement and operation of the machine are both old and well known in the art, the particular arrangement and operation being illustrated, described, and claimed in the United States Letters Patent No. 582,774, of May 18, 1897, at present owned by me.

One feature of novelty of the present machine resides in the mechanism for altering the relationship between the arms F and H— that is, in mechanism whereby the arms F and H may be brought closer together during their reciprocation, so that when closed by the rod P they will bear more firmly upon the work. This altering or adjusting mechanism consists, by preference, of the parts illustrated in Figs. 1 to 8, inclusive, and is as follows: In the upper toggle lever or arm Z works an eccentric pin or shaft $a$, to which is secured an arm $a'$, having a roll $a^2$, which during the reciprocation of the rod P is caused to travel over a table or guide $b$, which table or guide is adapted to be raised or lowered in the frame A. A preferred means for raising or lowering the table or guide $b$ consists of the slide $d$, having on its upper surface the wedges $d'$, upon which the oppositely-arranged wedge-shaped projections $b'$ of the table or guide $b$ rest. To the base of the slide $d$ is pivoted one end of a link $d^2$, the other end of which is pivoted to an elbow $d^3$, projecting from the sector $d^4$, which sector is pivoted, as at $d^5$, in the frame A. By turning the sector $d^4$ in one direction the slide $d$ is operated, so that its wedges will elevate the table or guide $b$, and by turning the sector in the opposite direction the table or guide $b$ will be lowered. The two positions assumed by the table or guide $b$, the arm $a'$ and its roll $a^2$, and the upper beam or arm F are shown in full and dotted lines in Fig. 4. It will be readily understood that the elevation of the guide $b$ will through the arm $a'$ and eccentric $a$ cause the upper beam or arm F to assume a more acute angle with respect to the lower arm H, and when the arms or beams F and H are closed down the working end of the arm F will more closely bind the work down upon the working end of the arm H.

It is to be understood that the mechanism for altering the relationship of the arms F and H, which is illustrated in Figs. 1 to 8 and has been hereinbefore described, is particularly adapted for use in a machine of the Patent No. 582,774, above referred to, wherein the arms F and H are opened and closed by toggle-levers Z and Z'. The mechanism is, however, adapted for use with other machines, and one portion of the present invention relates to an improved mechanism for opening and closing the arms F and H to be used with the altering or adjusting mechanism in which the toggle-levers Z and Z' are replaced by other means.

One form of the improved mechanism for opening and closing the arms F and H is illustrated in Figs. 9 to 12, inclusive, and is as follows: The arms F and H are pivoted in a a hollow block or head E', and their rear ends F' and H' are connected by springs $F^2$, which normally tend to separate the working ends of the arms F and H. The pivot for the arms F and H is the eccentric pin or shaft $a$, and the rear ends F' and H' of the arms are each provided with cam-plates $F^3$ and $H^3$, oppositely arranged with respect to their bearing or cam faces $f$ and $h$. The rod P is pivoted to the block E', as at P', and is provided at this point with two projections $P^2$, which ride against the cam-faces of the plates $P^3$ and $H^3$ and serve thereby to open the arms F' and H' against the tension of the springs $F^2$. When the arm $a'$ is elevated by the guide or table $b$, the eccentric $c$ will cause the working ends of the arms F' and H' to come closer together and will cause the cam-faces $f$ and $h$ to impinge upon the projections $P^2$. The rocking of the rod P and its projections $P^2$ will serve to cause the working ends of the arms F' and H' to clamp the work more closely and to separate from the work a much shorter distance than normally is the case.

In a modification of this latter form illustrated in Figs. 13 to 16, inclusive, the cam-plates $F^3$ and $H^3$ are movable in the end of the arms F' and H' and are directly operated by the arm $a'$ as follows: To the shaft $a$ of the arm $a'$ is secured the two rocker-arms $g$ and $g'$, the free end of each of which is connected by the links $g^2$ and $g^3$ with the cam-plates $F^3$ and $H^3$. When the arm $a'$ turns in one direction, the plates $F^3$ and $H^3$ are brought with their cam-faces $f$ and $h$ nearly opposite to each other, thus causing the working ends of the arms or beams F and H to more closely bind the work during the rocking of the projections $P^2$ of the rod P.

In Figs. 17 and 18 a still further modified form of the mechanism is illustrated, which, however, embodies a mere reversal of the parts illustrated in Figs. 9 to 12, inclusive.

In Figs. 19 to 23 are illustrated certain forms of auxiliary tools to be used with the working beams F and H for the purpose of more effectually softening the hide, skin, or leather. Each tool consists, essentially, of a flat plate $m$, from which project the main blades $m'$, of preferably V or curved shape. From each of the main blades project a series of short blades or vanes $m^2$ and $m^3$ at an angle to the main blades $m'$. The angle which the series of short blades $m^2$ makes with its main blades $m'$ is different from the angle which the series $m^3$ makes with its main blades $m'$. The angles of the main blades and short blades are indicated in diagram in Fig. 23.

Having thus described the nature and objects of my invention, what I claim as new, and desire to secure by Letters Patent, is—

1. In a machine of the character described, the combination of the working arms or beams, mechanism for reciprocating said arms, means for opening and closing the working ends of said arms during the reciprocation thereof, and means adapted to vary the relationship between said arms during their reciprocation, whereby in the opening and closing of the same the working ends may be brought more or less closely together, substantially as and for the purposes described.

2. In a machine of the character described, the combination of the working arms or beams, mechanism for reciprocating said arms, means for opening and closing the working ends of said arms and mechanism for altering the relationship of said arms, the same consisting of an eccentric adapted to bring the working ends of the arms more or less closely together, an arm secured to said eccentric, a table or guide on which said arm travels, and means for elevating or depressing said table or guide, substantially as and for the purposes described.

3. In a machine of the character described, two working arms, a reciprocating block in which said arms are pivoted, springs normally adapted to separate the working ends of said arms, two oppositely-arranged cam-plates carried by said arms, means for altering the relationship of said cam-plates, a rod, projections carried by said rod and rocking against said cam-plates, and means for reciprocating and rocking said rod, substantially as and for the purposes described.

In testimony whereof I have hereunto set my signature in the presence of two subscribing witnesses.

JOSEPH HALL.

Witnesses:
ANNA HEINS,
ETHEL ANNIE HALL.